United States Patent
Cao

(10) Patent No.: US 11,402,705 B2
(45) Date of Patent: Aug. 2, 2022

(54) LIQUID CRYSTAL DISPLAY PANEL AND MANUFACTURING METHOD THEREOF

(71) Applicant: TCL China Star Optoelectronics Technology Co., Ltd., Shenzhen (CN)

(72) Inventor: Zhibo Cao, Shenzhen (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 217 days.

(21) Appl. No.: 16/652,995

(22) PCT Filed: Feb. 27, 2020

(86) PCT No.: PCT/CN2020/076999
§ 371 (c)(1),
(2) Date: Apr. 2, 2020

(87) PCT Pub. No.: WO2021/134878
PCT Pub. Date: Jul. 8, 2021

(65) Prior Publication Data
US 2021/0405421 A1    Dec. 30, 2021

(30) Foreign Application Priority Data

Jan. 2, 2020   (CN) .......................... 202010000602.2

(51) Int. Cl.
  *G02F 1/1345* (2006.01)
  *G02F 1/1339* (2006.01)
(52) U.S. Cl.
  CPC ........ *G02F 1/13452* (2013.01); *G02F 1/1339* (2013.01)

(58) Field of Classification Search
  CPC .................................................. G02F 1/13452
  See application file for complete search history.

(56) References Cited

U.S. PATENT DOCUMENTS

| 2007/0110921 A1 | 5/2007 | Angelopoulos et al. |
| 2011/0285944 A1 | 11/2011 | Park et al. |
| 2013/0340934 A1 | 12/2013 | Chen |
| 2014/0002778 A1* | 1/2014 | Lin .................... G02F 1/133514 349/153 |
| 2017/0256573 A1 | 9/2017 | Jen et al. |
| 2018/0275437 A1* | 9/2018 | Nishiwaki ............. G02F 1/1339 |
| 2020/0201481 A1* | 6/2020 | Lee ........................ G06F 3/0446 |
| 2021/0357065 A1* | 11/2021 | Xiao .................... G06F 3/0443 |

FOREIGN PATENT DOCUMENTS

| CN | 1240537 | 1/2000 |
| CN | 102262325 | 11/2011 |
| CN | 102736302 | 10/2012 |
| CN | 106154649 | 11/2016 |

* cited by examiner

*Primary Examiner* — Edmond C Lau

(57) ABSTRACT

A liquid crystal display panel and a manufacturing method thereof are provided, in which transparent traces are prepared on a first substrate to replace metal traces originally under a sealant, so that ultraviolet light is irradiated on the sealant from a side of the transparent traces in a process of curing the sealant, which can effectively improve a curing rate of the sealant. Moreover, transparent conductive polymer has better corrosion resistance than metal, which can effectively prevent circuit corrosion caused by the sealant absorbing water.

13 Claims, 4 Drawing Sheets

LIQUID CRYSTAL DISPLAY PANEL AND MANUFACTURING METHOD THEREOF

RELATED APPLICATIONS

This application is a National Phase of PCT Patent Application No. PCT/CN2020/076999 having International filing date of Feb. 27, 2020, which claims the benefit of priority of Chinese Patent Application No. 202010000602.2 filed on Jan. 2, 2020. The contents of the above applications are all incorporated by reference as if fully set forth herein in their entirety.

FIELD AND BACKGROUND OF THE INVENTION

The present application relates to the field of display technologies, and in particular, to a liquid crystal display panel and a manufacturing method thereof.

Liquid crystal displays (LCDs) have low cost, high resolution, high contrast, and fast response times. They are one of the most important displays on the market today.

At present, materials in a liquid crystal cell of the liquid crystal displays mainly include sealant, polyimide (PI), liquid crystals, and other materials, and the sealant is positioned on metal traces around a panel. However, in a curing process of the sealant, the metal traces under the sealant will block ultraviolet light and reduce a curing rate of the sealant, which will reduce yield of the LCD panels.

SUMMARY OF THE INVENTION

Technical Problem

The present application provides a liquid crystal display panel and a manufacturing method thereof to solve the problem that a curing rate of a sealant is reduced due to underlying metal traces blocking ultraviolet light in a curing process of the conventional art sealant.

Technical Solutions

To solve the above problems, the technical solutions provided in the present application are as follows.

A liquid crystal display panel, including:
a first substrate, a second substrate, a liquid crystal layer, and a sealant; and
the liquid crystal display panel further including a display region and a non-display region surrounding the display region;
wherein the first substrate and the second substrate are bonded by the sealant surrounding the display region, and the liquid crystal layer is disposed in a range limited by the sealant;
wherein the first substrate includes a plurality of signal lines corresponding to the display region and a plurality of transparent traces corresponding to the non-display region, and the transparent traces include a transparent conductive polymer material;
wherein the sealant is disposed on the transparent traces; and
wherein a signal is transmitted between a circuit board and the signal lines through the transparent traces.

In the liquid crystal display panel of the present application, the transparent conductive polymer material includes at least one of polypyrrole, polyphenylene sulfide, polypeptidylcyanine, or polyaniline.

In the liquid crystal display panel of the present application, material for preparing the transparent traces further includes an organic solvent, and the organic solvent includes dimethylformamide and/or dimethylsulfoxide.

In the liquid crystal display panel of the present application, a thickness of each of the transparent traces ranges from 0.2 um to 0.4 um.

In the liquid crystal display panel of the present application, a part of the transparent traces is sandwiched between the sealant and the first substrate, and the other part of transparent traces is positioned between the display region and a region of the sealant corresponding to the first substrate.

In the liquid crystal display panel of the present application, the first substrate corresponding to the non-display region further includes at least one metal trace, and the at least one metal trace is disposed on a same layer as the transparent traces, wherein the signal is transmitted between the circuit board and the signal lines through the transparent traces and the at least one metal trace.

In the liquid crystal display panel of the present application, a projection of the transparent traces on the first substrate is positioned within a projection of the sealant on the first substrate, and a projection of the at least one metal trace on the first substrate is positioned outside the projection of the sealant on the first substrate and is close to a side of the display region.

In the liquid crystal display panel of the present application, the transparent traces and the at least one metal trace are arranged at equal intervals.

A method of manufacturing a liquid crystal display panel, including:
step S10, preparing a plurality of transparent traces in a non-display region of a first substrate, and the transparent traces including a transparent conductive polymer material;
step S20, preparing a sealant material layer in the non-display region of the first substrate, and disposing the sealant material layer on the transparent traces;
step S30, aligning a second substrate with the first substrate, and injecting liquid crystals between the first substrate and the second substrate using a liquid crystal injection process;
step S40, bonding the first substrate and the second substrate through the sealant material layer; and
step S50, irradiating the sealant material layer by ultraviolet light from a side of the first substrate away from the second substrate to cure the sealant material layer to obtain a sealant.

In the method of manufacturing the liquid crystal display panel of the present application, the method of preparing the transparent traces includes dissolving a transparent conductive polymer material in an organic solvent to form a transparent trace material, preparing the transparent trace material on the first substrate corresponding to the non-display region, placing the first substrate in a baking furnace, and drying the transparent trace material.

In the method of manufacturing the liquid crystal display panel of the present application, the organic solvent includes dimethylformamide and/or dimethylsulfoxide.

In the method of manufacturing the liquid crystal display panel of the present application, a thickness of the transparent trace material prepared on the first substrate ranges from 0.4 um to 0.6 um.

In the method of manufacturing the liquid crystal display panel of the present application, temperature in the baking of the first substrate ranges from 100° C. to 120° C., and baking time ranges from 30 min to 40 min.

A liquid crystal display panel, including:

a first substrate, a second substrate, a liquid crystal layer, and a sealant; and the liquid crystal display panel further including a display region and a non-display region surrounding the display region;

wherein the first substrate and the second substrate are bonded by the sealant surrounding the display region, and the liquid crystal layer is disposed in a range limited by the sealant;

wherein the first substrate includes a plurality of signal lines corresponding to the display region and a plurality of transparent traces corresponding to the non-display region, and the transparent traces include a transparent conductive polymer material;

wherein the sealant is disposed on the transparent traces;

wherein the transparent conductive polymer material includes at least one of polypyrrole, polyphenylene sulfide, polypeptidylcyanine, or polyaniline; and wherein a signal is transmitted between a circuit board and the signal lines through the transparent traces.

In the liquid crystal display panel of the present application, material of preparing the transparent traces further includes an organic solvent, and the organic solvent includes dimethylformamide and/or dimethylsulfoxide.

In the liquid crystal display panel of the present application, a thickness of each of the transparent traces ranges from 0.2 um to 0.4 um.

In the liquid crystal display panel of the present application, a part of the transparent traces is sandwiched between the sealant and the first substrate, and the other part of transparent traces is positioned between the display region and a region of the sealant corresponding to the first substrate.

In the liquid crystal display panel of the present application, the first substrate corresponding to the non-display region further includes at least one metal trace, and the at least one metal trace is disposed on a same layer as the transparent traces, wherein the signal is transmitted between the circuit board and the signal lines through the transparent traces and the at least one metal trace.

In the liquid crystal display panel of the present application, a projection of the transparent traces on the first substrate is positioned within a projection of the sealant on the first substrate, and a projection of the at least one metal trace on the first substrate is positioned outside the projection of the sealant on the first substrate and is close to a side of the display region.

In the liquid crystal display panel of the present application, the transparent traces and the at least one metal trace are arranged at equal intervals.

Beneficial Effect

In the present application, transparent traces are used to replace the metal traces originally under the sealant, and material of the transparent traces includes transparent conductive polymer. Since the transparent conductive polymer has advantages of high strength, high modulus, corrosion resistance, low water absorption, and the like, when the sealant is cured, ultraviolet light is irradiated on the sealant from a side of the transparent traces, which can effectively improve the curing rate of the sealant. Moreover, the conductive polymer has better corrosion resistance than metal, which can effectively prevent circuit corrosion caused by the sealant absorbing water. At the same time, the transparent material can be formed into a film by spraying, printing, spin coating, etc., which can effectively save the process steps.

DESCRIPTION OF SPECIFIC EMBODIMENTS OF THE INVENTION

The present application provides a liquid crystal display panel and a method of manufacturing the same. In order to make the purpose, technical solution, and effect of the present application clearer and more specific, the present application will be described in detail below with reference to the accompanying drawings and embodiments. It should be understood that the specific embodiments described herein are only used to explain the application, and are not used to limit the application.

Figure 1:
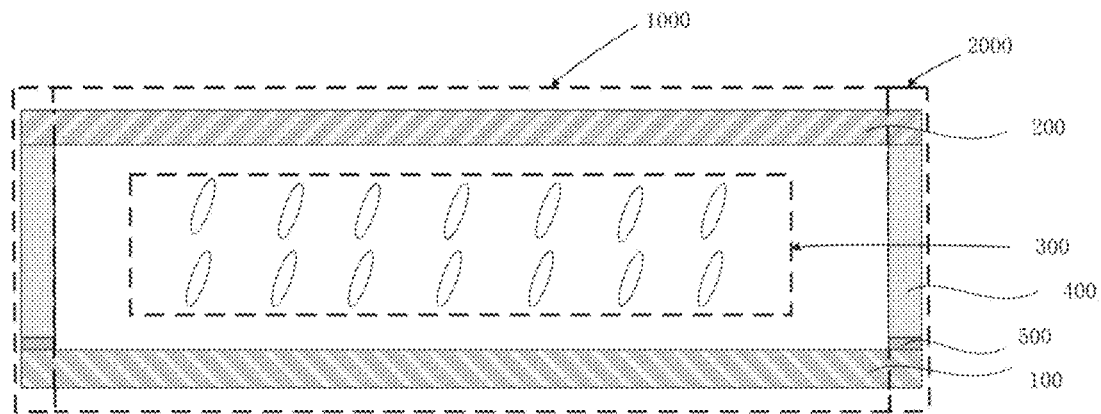
FIG. 1 is a schematic structural diagram of a first liquid crystal display panel according to an embodiment of the present application.

Please refer to FIG. 1, which is a schematic structural diagram of a first liquid crystal display panel according to an embodiment of the present application.

In the present application, the liquid crystal display panel includes a display region 1000 and a non-display region 2000 surrounding the display region 1000.

The liquid crystal display panel includes a first substrate 100 and a second substrate 200 opposite to each other, a liquid crystal layer 300, and a sealant 400.

The first substrate 100 and the second substrate 200 are bonded by the sealant 400 surrounding the display region 1000. The liquid crystal layer 300 is disposed in a range limited by the sealant 400.

The first substrate 100 includes a plurality of transparent traces 500 corresponding to the non-display region 2000, and a material of the transparent traces 500 includes a transparent conductive polymer material.

The transparent conductive polymer material includes, but is not limited to, polypyrrole, polyphenylene sulfide, polypeptidylcyanine, and polyaniline.

The transparent conductive polymer is a type of polymer material that is chemically or electrochemically "doped" by a polymer having a conjugated π bond, so that it is transformed from an insulator to a conductor. The room-temperature conductivity of the transparent conductive polymer can be changed within a range of the semiconductor metal state of the insulator, and the transparent conductive polymer has the advantages of high polymer strength, high modulus, corrosion resistance, low water absorption, and the like.

In the present application, the sealant 400 is disposed on the transparent traces 500.

A thickness of the transparent traces 500 ranges from 0.2 um to 0.4 um.

Furthermore, the thickness of the transparent traces 500 is 0.3 um.

Figure 2:
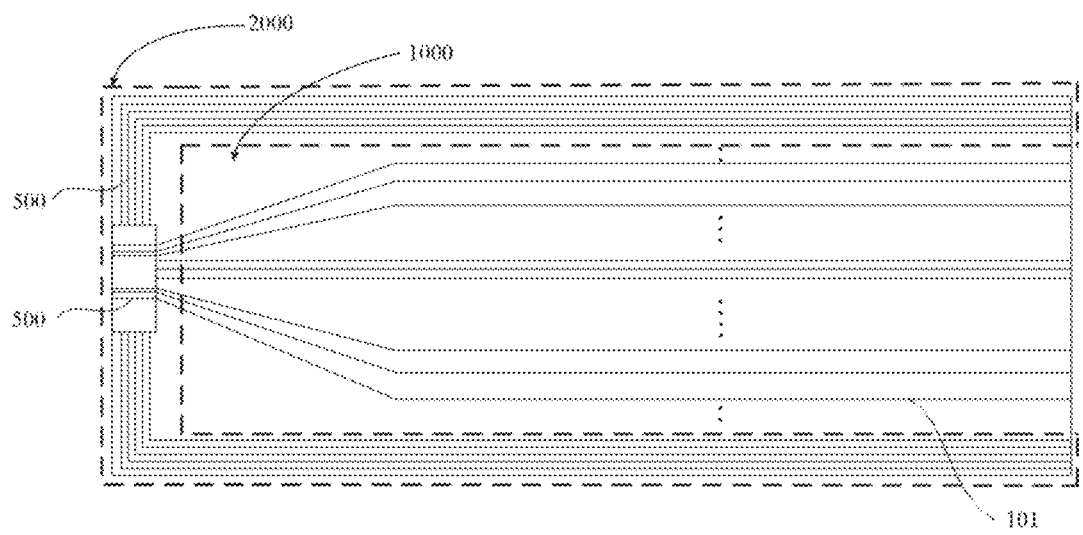
FIG. 2 is a top plane view of a first substrate of the first liquid crystal display panel according to an embodiment of the present application.

Please refer to FIG. 2, which is a first plane view of the first substrate of the liquid crystal display panel of the present application.

In the present application, the first substrate 100 includes a plurality of signal lines 101 corresponding to the display region 1000 and the transparent traces 500 corresponding to the non-display region 2000.

The signal lines 101 extend from the display region 1000 to a side of the non-display region 2000, and are electrically connected to the transparent traces 500.

In the present application, a projection of a part of the transparent traces 500 on the first substrate 100 is in contact with a projection of the signal lines 101 on the first substrate 100, but does not overlap.

A signal is transmitted between a circuit board and the signal lines 101 through the transparent traces 500.

Figure 3:
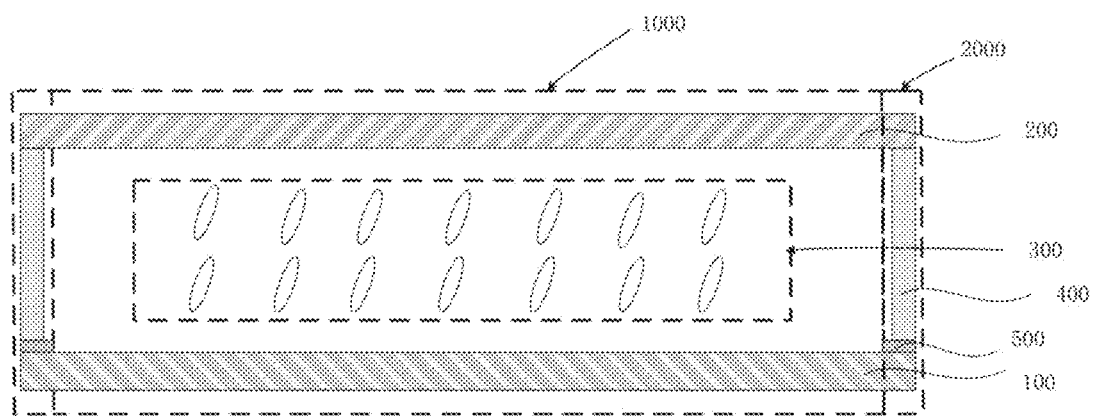
FIG. 3 is a schematic structural diagram of a second liquid crystal display panel according to an embodiment of the present application.

Please refer to FIG. 3, which is a schematic structural diagram of a second liquid crystal display panel of the present application.

The structure of the liquid crystal display panel is similar/same as that of the liquid crystal display panel in the above application. For details, please refer to the description of the liquid crystal display panel in the above application, which will not be repeated here. The differences between the two are described as follows.

In the present application, a part of the transparent traces 500 is sandwiched between the sealant 400 and the first substrate 100, and the other part of transparent traces 500 is positioned between the display region 1000 and a region of the sealant 400 corresponding to the first substrate 100.

In the present application, there is a certain distance between the sealant 400 and the display region 1000, which is beneficial to prevent the sealant 400 from causing pollution to the liquid crystal layer 300 and the problem of uneven brightness in a region around the liquid crystal display panel.

Figure 4:
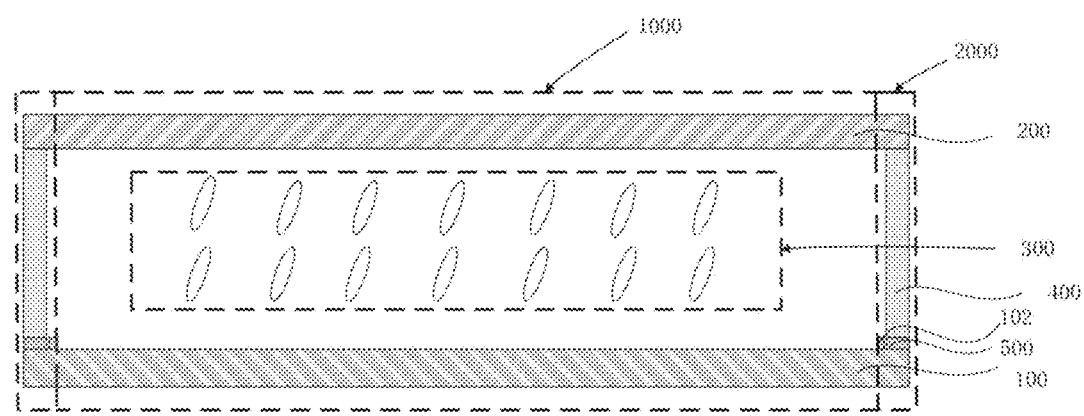
FIG. 4 is a schematic structural diagram of a third liquid crystal display panel according to an embodiment of the present application.

Please refer to FIG. 4, which is a schematic structural diagram of a third liquid crystal display panel of the present application.

The structure of the liquid crystal display panel is similar/same as that of the liquid crystal display panel in the above application. For details, please refer to the description of the liquid crystal display panel in the above application, which will not be repeated here. The differences between the two are described as follows.

The first substrate 100 corresponding to the non-display region 2000 further includes at least one metal trace 102. The metal trace 102 is disposed on a same layer as the transparent traces 500.

Figure 5:
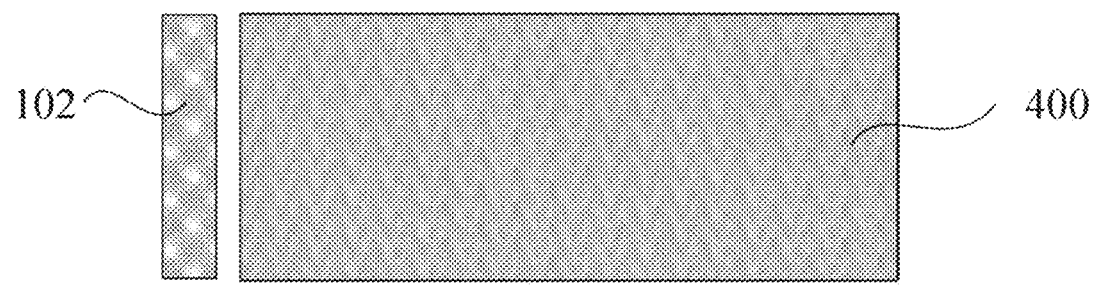
FIG. 5 is a top plane view of a sealant of a liquid crystal display panel according to an embodiment of the present application.

Please refer to FIG. 5, which is a top plane view of the sealant of the liquid crystal display panel of the present application.

In the present application, a projection of the transparent traces 500 on the first substrate 100 is within a projection of the sealant 400 on the first substrate 100, and a projection of the metal trace 102 on the first substrate 100 is positioned outside the projection of the sealant 400 on the first substrate 100 and is close to a side of the display region 1000.

In the present application, the transparent traces 500 and the metal trace 102 are arranged at equal intervals.

In the present application, the metal trace 102 is not in contact with the sealant 400, so the sealant 400 is not affected by the metal trace 102 in a curing process.

Figure 6:
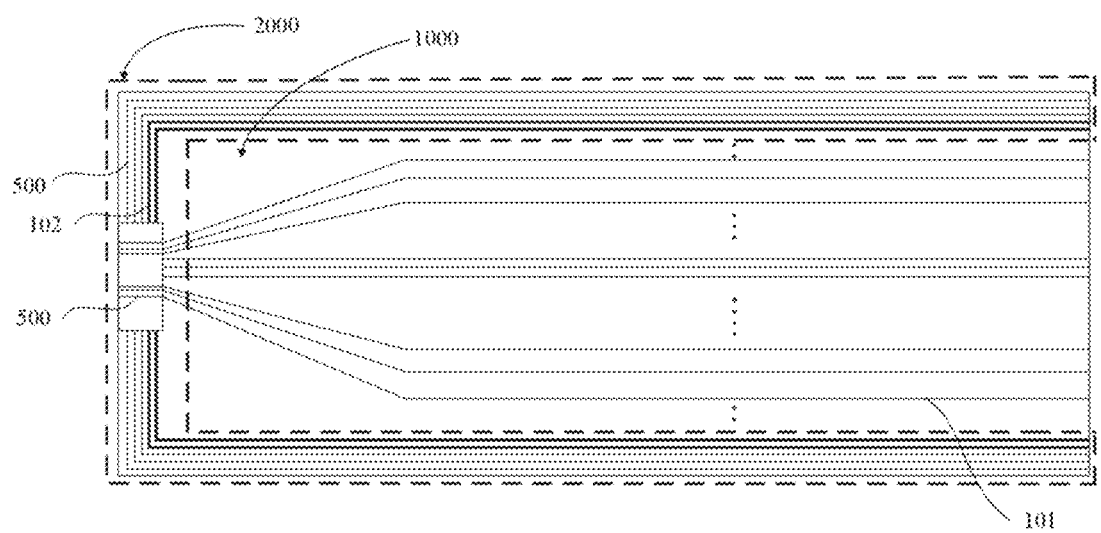
FIG. 6 is a top plane view of a first substrate of the second liquid crystal display panel according to an embodiment of the present application.

Please refer to FIG. 6, which is a second plane view of the first substrate of the liquid crystal display panel of the present application.

The top plane view on the first substrate of the liquid crystal display panel is similar/same as the top plane view on the first substrate of the liquid crystal display panel in the above application. For details, refer to the description of the top plane view of the first substrate of the liquid crystal display panel in the above application, which will not be repeated here. The differences between the two are described as follows.

The first substrate 100 includes signal lines 101 corresponding to the display region 1000, and transparent traces 500 and the metal trace 102 corresponding to the non-display region 2000.

The transparent traces 500 and the metal trace 102 are arranged at equal intervals.

In the present application, the signal is transmitted between the circuit board and the signal lines 101 through the transparent traces 500 and the metal trace.

In the present application, the transparent traces 500 are prepared on the first substrate 100 to replace the metal trace 102 originally under the sealant 400, so that ultraviolet light is incident into the sealant 400 from a side of the transparent traces 500 in the curing process of the sealant 400, which can effectively improve a curing rate of the sealant 400. In addition, the transparent conductive polymer has better corrosion resistance than metal, which can effectively prevent circuit corrosion caused by the sealant 400 after absorbing water.

The technical solution of the present application is described in combination with specific embodiments.

Figure 7:
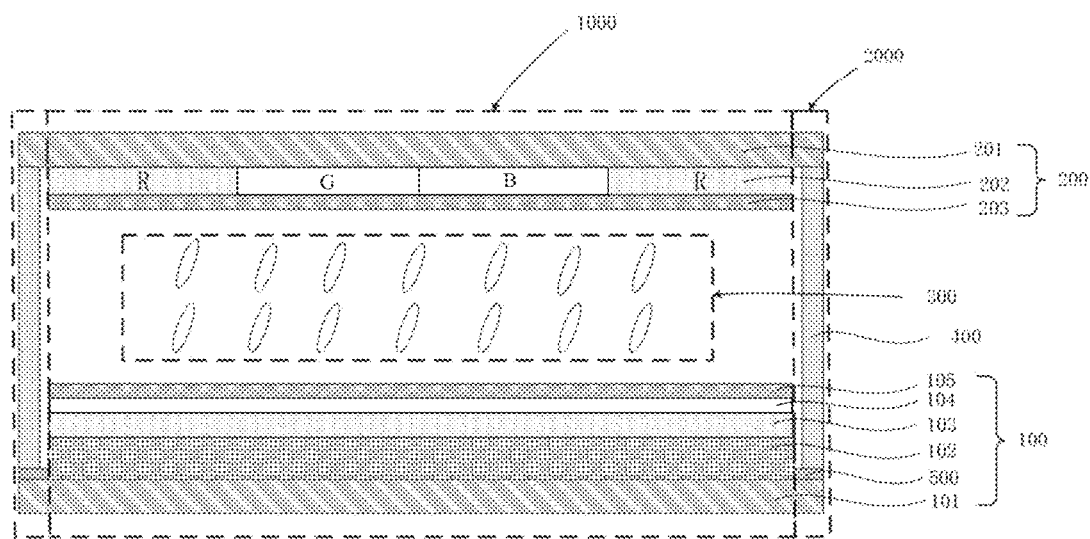
FIG. 7 is a schematic structural diagram of a liquid crystal display panel according to an embodiment of the present application.

Please refer to FIG. 7, which is a schematic structural diagram of the liquid crystal display panel according to an embodiment of the present application.

In the present embodiment, the first substrate 100 is an array substrate.

The first substrate 100 includes a first base 101, and a thin film transistor layer 102, a planarization layer 103, a pixel definition layer 104, and a first alignment film 105, which are sequentially disposed on a side of the first base 101 facing the second substrate.

The first substrate 100 further includes the transparent traces 500 corresponding to the non-display region 2000.

In the present embodiment, the second substrate 200 is a color filter substrate.

The second substrate 200 includes a second base 201, and a color resistance layer 202 and a second alignment film 203 disposed on a side of the second base 201 facing the first substrate 100.

In the present embodiment, the array substrate and the color filter substrate are bonded by the sealant 400 surrounding the display region, and the liquid crystal layer 300 is disposed in a range limited by the sealant 400.

Among them, the part of the transparent traces 500 is sandwiched between the sealant 400 and the first substrate 100, and the other part of transparent traces 500 is positioned between the display region 1000 and the region of the sealant 400 corresponding to the first substrate 100.

There is a certain distance between the sealant 400 and the display region 1000.

The material of the transparent traces 500 includes a transparent conductive polymer material.

In the present embodiment, the transparent conductive polymer material includes, but is not limited to, polypyrrole, polyphenylene sulfide, polypeptidylcyanine, and polyaniline.

In the present embodiment, a material for preparing the transparent traces further includes an organic solvent, and the organic solvent includes dimethylformamide and/or dimethylsulfoxide.

In the present embodiment, color of the color resistance layer 202 can be one of red, green, or blue, and color of the color resistance layer 202 is not limited.

In the present embodiment, the transparent traces 500 are prepared by adding the transparent conductive polymer material to the organic solvent.

In the present embodiment, the transparent traces 500 are prepared on the side of the first substrate 100 facing the second substrate 200 to replace the metal trace originally positioned under the sealant 400. Since material of the transparent traces 500 includes transparent conductive polymer, and the transparent conductive polymer has advantages of high strength, high modulus, corrosion resistance, low water absorption, and the like, therefore the transparent traces 500 have better corrosion resistance than the metal trace, which can effectively prevent circuit corrosion caused by the sealant 400 absorbing water. Furthermore, when the metal trace 102 is positioned under the sealant 400, the metal trace 102 will block ultraviolet light in the curing process of the sealant 400, so that the curing rate of the sealant 400 is reduced.

As the transparent traces 500 have good light transmittance, replacing the metal trace 102 with the transparent traces 500 can effectively improve the curing rate of the sealant 400, reduce illuminance of ultraviolet rays, save resources, and improve yield of the liquid crystal display panel.

In addition, there is a certain distance between the sealant 400 and the display region 1000, which is beneficial to prevent the sealant 400 from causing pollution to the liquid crystal layer 300 and the problem of uneven brightness in a region around the liquid crystal display panel.

Figure 8:
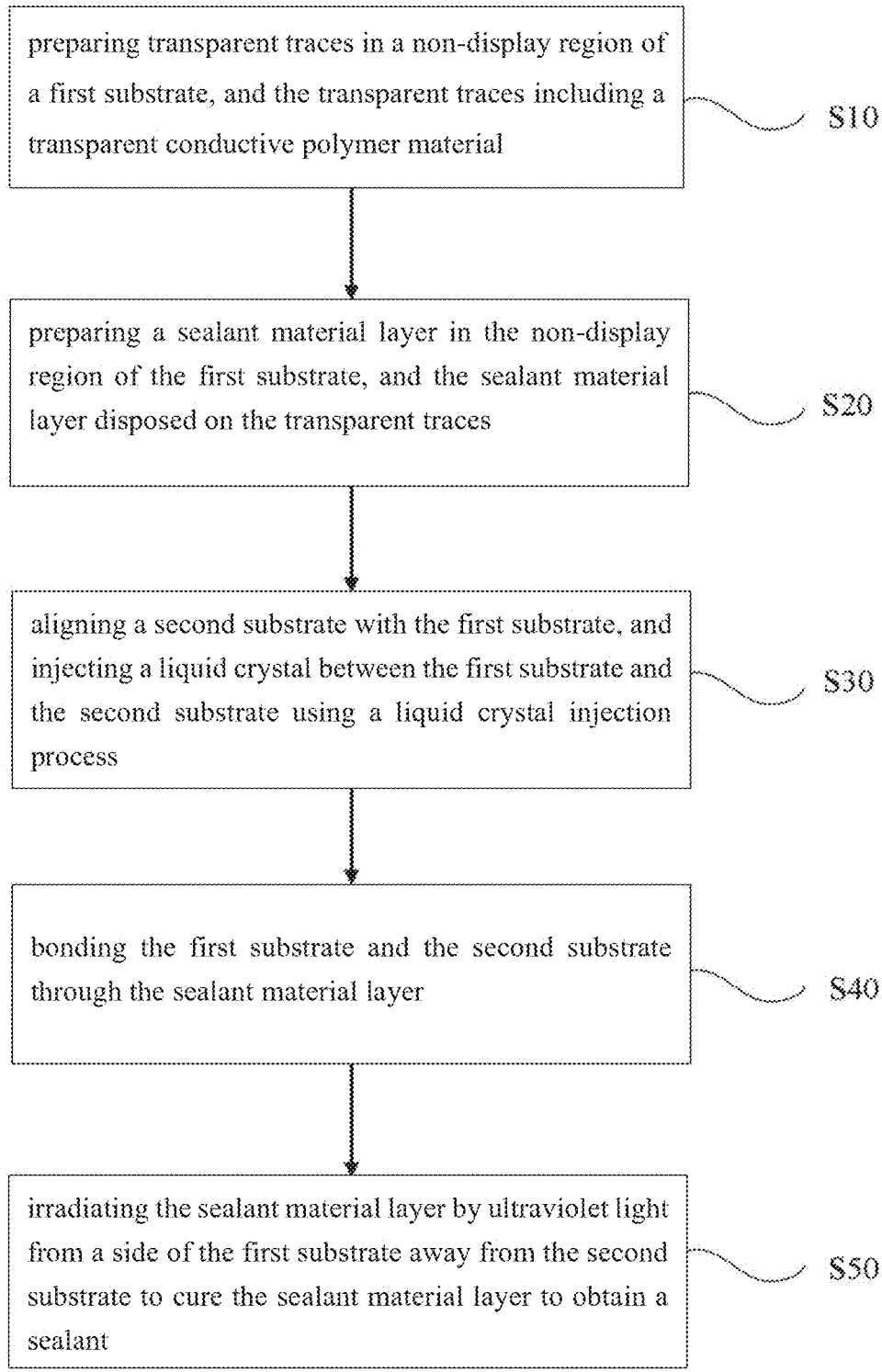
FIG. 8 is a flowchart of a method of manufacturing a liquid crystal display panel according to an embodiment of the present application.

Referring to FIG. 8, the present application also provides a method of manufacturing a liquid crystal display panel, including the following steps.

Step S10, preparing a plurality of transparent traces 500 in a non-display region 1000 of a first substrate 100. The transparent traces 500 include a transparent conductive polymer material.

In the manufacturing method of the present application, the transparent conductive polymer material includes, but is not limited to, polypyrrole, polyphenylene sulfide, polypeptidylcyanine, and polyaniline.

A thickness of the transparent trace ranges from 0.2 um to 0.4 um.

Furthermore, the thickness of the transparent trace is 0.3 um.

In the manufacturing method of the present application, the preparation method of the transparent traces 500 includes following steps.

Step S101, which includes a procedure of dissolving the transparent conductive polymer material in an organic solvent to form a transparent trace material.

In the manufacturing method of the present application, the organic solvent includes dimethylformamide and/or dimethylsulfoxide.

Step S102, which includes a procedure of preparing the transparent trace material on the first substrate 100 corresponding to the non-display region 1000.

In the manufacturing method of the present application, a thickness of the transparent trace material prepared on the first substrate 100 ranges from 0.4 um to 0.6 um.

Furthermore, the thickness of the transparent trace material prepared on the first substrate 100 is 0.5 um.

In the manufacturing method of the present application, the transparent material can be prepared on the first substrate 100 by spraying, printing, and spin coating, which can effectively save processing steps, and is not limited thereto.

Step S103, which includes a procedure of placing the first substrate 100 in a baking furnace, and drying the transparent trace material.

In the manufacturing method of the present application, temperature in the baking of the first substrate 100 ranges from 100° C. to 120° C., and baking time ranges from 30 min to 40 min.

Furthermore, the baking temperature is 110° C., and the baking time is 35 min.

Step S20, which includes a procedure of preparing a sealant material layer in the non-display region 1000 of the first substrate 100, and disposing the sealant material layer on the transparent traces.

Step S30, which includes a procedure of aligning a second substrate 200 with the first substrate 100, and injecting liquid crystals 300 between the first substrate 100 and the second substrate 200 using a liquid crystal injection process.

Step S40, which includes a procedure of bonding the first substrate 100 and the second substrate 200 through the sealant material layer.

Step S50, which includes a procedure of irradiating the sealant material layer by ultraviolet light from a side of the first substrate 100 to cure the sealant material layer to obtain a sealant 400.

In summary, the present application provides a liquid crystal display panel and a method of manufacturing the same. The liquid crystal display panel includes a first substrate, a second substrate, a liquid crystal layer, and a sealant. The liquid crystal display panel includes a display region and a non-display region surrounding the display region. The first substrate and the second substrate are bonded by the sealant surrounding the display region, and the liquid crystal layer is disposed in a range limited by the sealant. The first substrate includes a plurality of signal lines corresponding to the display region and a plurality of transparent traces corresponding to the non-display region, the transparent traces include a transparent conductive polymer material, and the sealant is disposed on the transparent traces. A signal is transmitted between a circuit board and the signal lines through the transparent traces.

In the present application, the transparent traces are prepared on the first substrate to replace the metal traces originally under the sealant, and material of the transparent traces includes transparent conductive polymer. The transparent conductive polymer has advantages of high strength, high modulus, corrosion resistance, low water absorption, and the like, so that ultraviolet light is irradiated on the sealant from a side of the transparent traces in a process of curing the sealant, which can effectively improve the curing rate of the sealant. Moreover, the conductive polymer has better corrosion resistance than metal, which can effectively prevent circuit corrosion caused by the sealant absorbing water. At the same time, the transparent material can be formed into a film by spraying, printing, spin coating, etc., which can effectively save the process steps.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display panel, comprising:
    a first substrate, a second substrate, a liquid crystal layer, and a sealant; and
    the liquid crystal display panel further comprising a display region and a non-display region surrounding the display region;
    wherein the first substrate and the second substrate are bonded by the sealant surrounding the display region, and the liquid crystal layer is disposed in a range limited by the sealant;
    wherein the first substrate comprises a plurality of signal lines corresponding to the display region and a plurality of transparent traces corresponding to the non-display region, and the transparent traces comprise a transparent conductive polymer material;
    wherein the sealant is disposed on the transparent traces;
    wherein a signal is transmitted between a circuit board and the signal lines through the transparent traces; and
    wherein the first substrate corresponding to the non-display region further comprises at least one metal trace, and the at least one metal trace is disposed on a same layer as the transparent traces, wherein the signal is transmitted between the circuit board and the signal lines through the transparent traces and the at least one metal trace.

2. The liquid crystal display panel according to claim 1, wherein the transparent conductive polymer material comprises at least one of polypyrrole, polyphenylene sulfide, polypeptidylcyanine, or polyaniline.

3. The liquid crystal display panel according to claim 1, wherein material for preparing the transparent traces further comprises an organic solvent, and the organic solvent comprises dimethylformamide and/or dimethylsulfoxide.

4. The liquid crystal display panel according to claim 1, wherein a thickness of each of the transparent traces ranges from 0.2 um to 0.4 um.

5. The liquid crystal display panel according to claim 1, wherein a part of the transparent traces is sandwiched between the sealant and the first substrate, and the other part of transparent traces is positioned between the display region and a region of the sealant corresponding to the first substrate.

6. The liquid crystal display panel according to claim 1, wherein a projection of the transparent traces on the first substrate is positioned within a projection of the sealant on the first substrate, and a projection of the at least one metal trace on the first substrate is positioned outside the projection of the sealant on the first substrate and is close to a side of the display region.

7. The liquid crystal display panel according to claim 1, wherein the transparent traces and the at least one metal trace are arranged at equal intervals.

8. A liquid crystal display panel, comprising:
    a first substrate, a second substrate, a liquid crystal layer, and a sealant; and
    the liquid crystal display panel further comprising a display region and a non-display region surrounding the display region;
    wherein the first substrate and the second substrate are bonded by the sealant surrounding the display region, and the liquid crystal layer is disposed in a range limited by the sealant;
    wherein the first substrate comprises a plurality of signal lines corresponding to the display region and a plurality of transparent traces corresponding to the non-display region, and the transparent traces comprise a transparent conductive polymer material;
    wherein the sealant is disposed on the transparent traces;
    wherein the transparent conductive polymer material comprises at least one of polypyrrole, polyphenylene sulfide, polypeptidylcyanine, or polyaniline;
    wherein a signal is transmitted between a circuit board and the signal lines through the transparent traces; and
    wherein the first substrate corresponding to the non-display region further comprises at least one metal trace, and the at least one metal trace is disposed on a same layer as the transparent traces, wherein the signal is transmitted between the circuit board and the signal lines through the transparent traces and the at least one metal trace.

9. The liquid crystal display panel according to claim 8, wherein material for preparing the transparent traces further comprises an organic solvent, and the organic solvent comprises dimethylformamide and/or dimethylsulfoxide.

10. The liquid crystal display panel according to claim 8, wherein a thickness of each of the transparent traces ranges from 0.2 um to 0.4 um.

11. The liquid crystal display panel according to claim 8, wherein a part of the transparent traces is sandwiched between the sealant and the first substrate, and the other part of transparent traces is positioned between the display region and a region of the sealant corresponding to the first substrate.

12. The liquid crystal display panel according to claim 8, wherein a projection of the transparent traces on the first substrate is positioned within a projection of the sealant on the first substrate, and a projection of the at least one metal trace on the first substrate is positioned outside the projection of the sealant on the first substrate and is close to a side of the display region.

13. The liquid crystal display panel according to claim 8, wherein the transparent traces and the at least one metal trace are arranged at equal intervals.

* * * * *